United States Patent
Laine et al.

(10) Patent No.: US 11,068,781 B2
(45) Date of Patent: Jul. 20, 2021

(54) TEMPORAL ENSEMBLING FOR SEMI-SUPERVISED LEARNING

(71) Applicant: NVIDIA Corporation, Santa Clara, CA (US)

(72) Inventors: Samuli Matias Laine, Vantaa (FI); Timo Oskari Aila, Tuusula (FI)

(73) Assignee: NVIDIA Corporation, Santa Clara, CA (US)

( * ) Notice: Subject to any disclaimer, the term of this patent is extended or adjusted under 35 U.S.C. 154(b) by 866 days.

(21) Appl. No.: 15/721,433

(22) Filed: Sep. 29, 2017

(65) Prior Publication Data
US 2018/0101768 A1 Apr. 12, 2018

Related U.S. Application Data

(60) Provisional application No. 62/405,781, filed on Oct. 7, 2016.

(51) Int. Cl.
*G06N 3/08* (2006.01)
*G06N 3/04* (2006.01)

(52) U.S. Cl.
CPC ............... *G06N 3/08* (2013.01); *G06N 3/049* (2013.01); *G06N 3/0454* (2013.01);
(Continued)

(58) Field of Classification Search
CPC ...... G06N 3/08; G06N 3/0454; G06N 3/0472; G06N 3/049; G06N 3/088
(Continued)

(56) References Cited

U.S. PATENT DOCUMENTS

| 5,444,796 A * | 8/1995 | Ornstein | .............. G06K 9/6267 |
| | | | 382/157 |
| 9,646,243 B1 * | 5/2017 | Gokmen | .............. G06N 3/0454 |

(Continued)

FOREIGN PATENT DOCUMENTS

WO  WO-02061679 A2 *  8/2002  ............... G06N 3/08

OTHER PUBLICATIONS

Yun Yang & Ke Chen, Temporal Data Clustering via Weighted Clustering Ensemble with Different Representations, Feb. 2011, IEEE Transactions on Knowledge and Data Engineering, vol. 23, No. 2, pp. 307-319 (Year: 2011).*

(Continued)

*Primary Examiner* — Miranda M Huang
*Assistant Examiner* — Leon W Cheung
(74) *Attorney, Agent, or Firm* — Leydig, Voit & Mayer, Ltd.

(57) ABSTRACT

A method, computer readable medium, and system are disclosed for implementing a temporal ensembling model for training a deep neural network. The method for training the deep neural network includes the steps of receiving a set of training data for a deep neural network and training the deep neural network utilizing the set of training data by: analyzing the plurality of input vectors by the deep neural network to generate a plurality of prediction vectors, and, for each prediction vector in the plurality of prediction vectors corresponding to the particular input vector, computing a loss term associated with the particular input vector by combining a supervised component and an unsupervised component according to a weighting function and updating the target prediction vector associated with the particular input vector.

20 Claims, 11 Drawing Sheets

(52) U.S. Cl.
CPC ........... *G06N 3/0472* (2013.01); *G06N 3/082* (2013.01); *G06N 3/088* (2013.01)

(58) Field of Classification Search
USPC .......................................................... 706/21
See application file for complete search history.

(56) References Cited

U.S. PATENT DOCUMENTS

| | | | | |
|---|---|---|---|---|
| 9,715,656 | B1* | 7/2017 | Gokmen | G06N 3/08 |
| 9,779,355 | B1* | 10/2017 | Leobandung | G06N 3/084 |
| 10,127,477 | B2* | 11/2018 | Chen | G06K 9/66 |
| 2016/0321522 | A1* | 11/2016 | Yuan | G06N 3/0454 |
| 2017/0262735 | A1* | 9/2017 | Ros Sanchez | G06K 9/4628 |
| 2017/0330076 | A1* | 11/2017 | Valpola | G06N 7/046 |
| 2017/0372201 | A1* | 12/2017 | Gupta | G06N 20/00 |
| 2018/0025271 | A1* | 1/2018 | Sawada | G06N 3/0454 706/25 |
| 2019/0034766 | A1* | 1/2019 | Chen | G06N 5/003 |
| 2019/0113973 | A1* | 4/2019 | Coleman | A61B 5/0024 |

OTHER PUBLICATIONS

Papandreou et al., Weakly-and Semi-Supervised Learning of a Deep Convolutional Network for Semantic Image Segmentation, Oct. 2015 (Year: 2015).*

Papandreou et al., "Weakly- and Semi-Supervised Learning of a Deep Convolutional Network for Semantic Image Segmentation", Oct. 5, 2015, arXiv:1502.02734v3 [cs.CV] (Year: 2015).*

Kingma et al., "Semi-supervised Learning with Deep Generative Models", Oct. 31, 2014, arXiv:1406.5298v2 [cs.LG] (Year: 2014).*

Bengio, "How Auto-Encoders Could Provide Credit Assignment in Deep Networks via Target Propagation", Sep. 18, 2014, arXiv:1407.7906v3 (Year: 2014).*

Kingma et al., "ADAM: Amethod for Stochastic Optimization," ICLR, 2015, pp. 1-15.

Bachman et al., "Learning with Pseudo-Ensembles," Advances in Neural Information Processing Systems, 2014, pp. 1-9.

Rasmus et al., "Semi-Supervised Learning with Ladder Networks," Advances in Neural Information Processing Systems, 2015, pp. 1-19.

Reed et al., "Training Deep Neural Networks on Noisy Labels With Bootstrapping," 2014, pp. 1-11.

Sajjadi et al., "Regularization With Stochastic Transformations and Perturbations for Deep Semi-Supervised Learning," Advances in Neural Information Processing Systems, 2016, pp. 1-9.

Wang, X, et al., "Unsupervised learning of visual representations using videos," in Proceedings of the IEEE International Conference on Computer Vision, pp. 2794-2802, 2015.

Jayaraman, D., "Learning image representations tied to ego-motion," in Proceedings of the IEEE International Conference on Computer Vision, pp. 1413-1421, 2015.

* cited by examiner

TEMPORAL ENSEMBLING FOR SEMI-SUPERVISED LEARNING

CROSS-REFERENCE TO RELATED APPLICATIONS

This application claims the benefit of U.S. Provisional Application No. 62/405,781 titled "Temporal Ensembling for Semi-Supervised Learning," filed Oct. 7, 2016, the entire contents of which is incorporated herein by reference.

FIELD OF THE INVENTION

The present invention relates to machine learning, and more particularly to a technique for training deep neural networks.

BACKGROUND

Deep neural networks can be used to perform a variety of tasks. One common task for which deep neural networks have been implemented is for image classification, but other types of tasks are within the scope of the present disclosure. In order to implement a deep neural network, some training of the network is performed prior to the network's deployment using a known set of training data. Various techniques have been proposed to train deep neural networks.

One such technique is referred to as the Π-model, which produces a more robust network than other previously utilized techniques by introducing noise into the input vectors and utilizing network dropout to make the training more robust. The Π-model is a special case of transformation/stability loss as described in Sajjadi, M. et al. ("Regularization with Stochastic Transformations and Perterbations for Deep Semi-Supervised Learning." *Advances in Neural Information Processing Systems* (NIPS) 29, 2016.), which is herein incorporated by reference in its entirety. The same set of input vectors is utilized to combine aspects of both supervised and unsupervised learning. However, evaluating the same set of input vectors by the deep neural network multiple times with different perturbations increases the time needed for training. Thus, there is a need for addressing these issues and/or other issues associated with the prior art.

SUMMARY

A method, computer readable medium, and system are disclosed for implementing a temporal ensembling model for training a deep neural network. The method for training the deep neural network includes the steps of receiving a set of training data for a deep neural network and training the deep neural network utilizing the set of training data by: analyzing the plurality of input vectors by the deep neural network to generate a plurality of prediction vectors, and, for each prediction vector in the plurality of prediction vectors corresponding to the particular input vector, computing a loss term associated with the particular input vector by combining a first supervised component and a second unsupervised component according to a weighting function and updating the target prediction vector associated with the particular input vector.

DETAILED DESCRIPTION

Training of deep neural networks can be improved by utilizing a temporal ensembling technique that combines prediction vectors generated over multiple training epochs to track a target prediction vector associated with an input vector to implement a form of unsupervised learning that enhances a robustness of the trained network. During a particular training epoch, the network is only used to evaluate a particular input vector once, but the results of that training epoch are fed forward into additional training epochs utilizing the same input vectors. The temporal ensembling technique reduces the need for evaluating the same input vector multiple times during a single training epoch like in current training techniques such as the Π-model.

Figure 1:
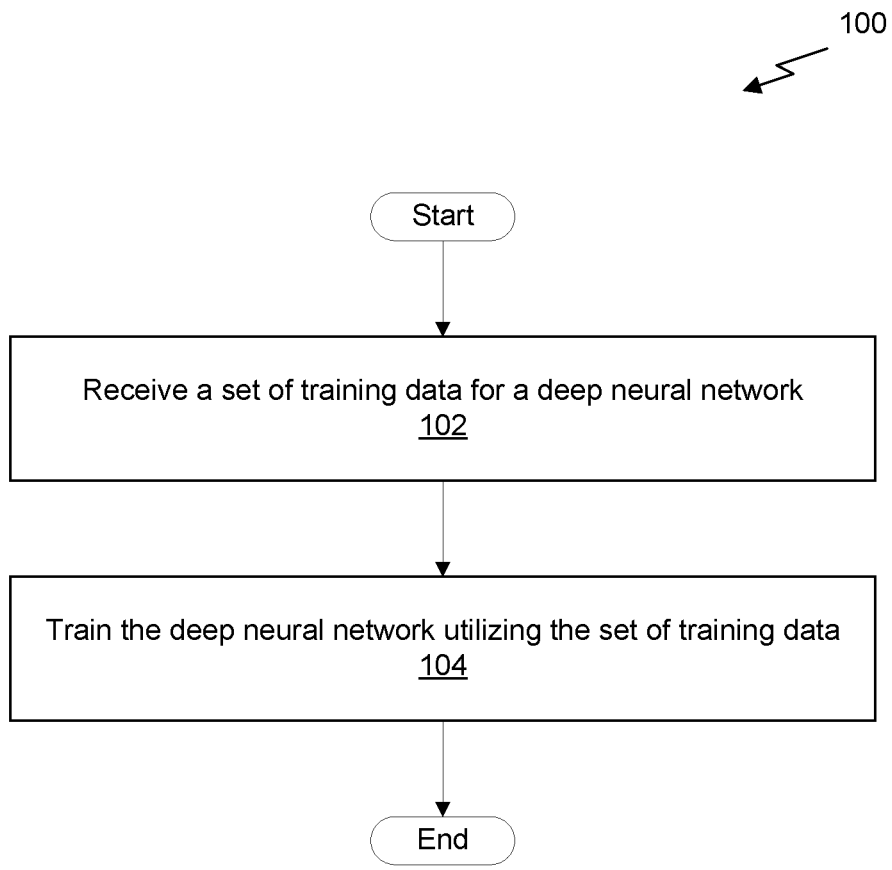
FIG. 1 illustrates a flowchart of a method for training a deep neural network, in accordance with one embodiment.

FIG. 1 illustrates a flowchart of a method 100 for training a deep neural network, in accordance with one embodiment. It will be appreciated that the method 100 is described within the scope of software executed by a processor; however, in some embodiments, the method 100 may be implemented in hardware or some combination of hardware and software. The method 100 begins at step 102, where a set of training data is received. The set of training data may include a plurality of input vectors and a plurality of label vectors. Each label vector in the plurality of label vectors corresponds to a particular input vector in the plurality of input vectors. It will be appreciated that some input vectors in the plurality of input vectors may not be associated with a label vector in the plurality of label vectors. In other words, some of the training data may not have a desired output associated with the input. Pairs of input vectors and corresponding label vectors will be used for both supervised and unsupervised learning while input vectors without a corresponding label vector will only be used for unsupervised learning.

At step 104, the deep neural network is trained utilizing the set of training data. In one embodiment, a first training epoch is performed. A set of target prediction vectors are initialized (e.g., zero vectors) and stored in a memory. For each input vector $x_i$ in the plurality of input vectors, the input vector is analyzed by a deep neural network to generate a prediction vector $z_i$. A supervised component of a loss term is calculated by comparing the prediction vector $z_i$ with a label vector $y_i$. Again, the supervised component of the loss term will be zero for any input vectors that are not associated with a corresponding label vector $y_i$. An unsupervised component of a loss term is calculated by comparing the prediction vector $z_i$ with a target prediction vector $\tilde{z}_i$. The loss term for the input vector is then calculated by combining the supervised component with the unsupervised component based on a weighting function. In one embodiment, the weighting function may be a function of the number of training epochs that have been performed. The prediction vector $z_i$ is utilized to update the target prediction vector $\tilde{z}_i$ that is used when calculating the unsupervised component of the loss term for the input vector during subsequent training epochs. Step 104 may be repeated for a number of training epochs.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 2:
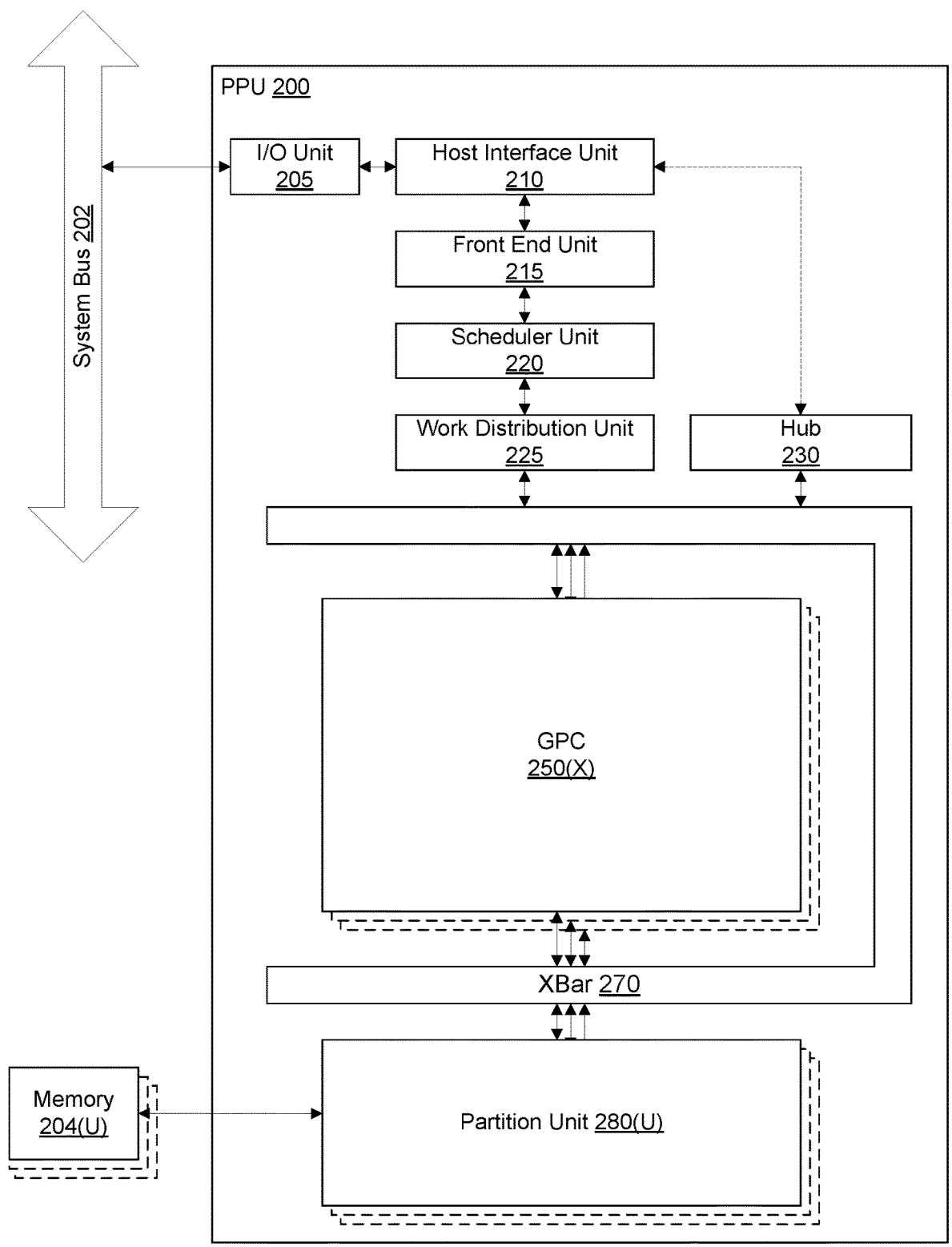
FIG. 2 illustrates a parallel processing unit (PPU), in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 provides the front end unit 215 with pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In one embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 are coupled to the host unit 210. The other units may also be connected to the XBar 270 via a hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. In one embodiment, the PPU 200 includes a number U of partition units 280 that is equal to the number of separate and distinct memory devices 204 coupled to the PPU 200. A partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
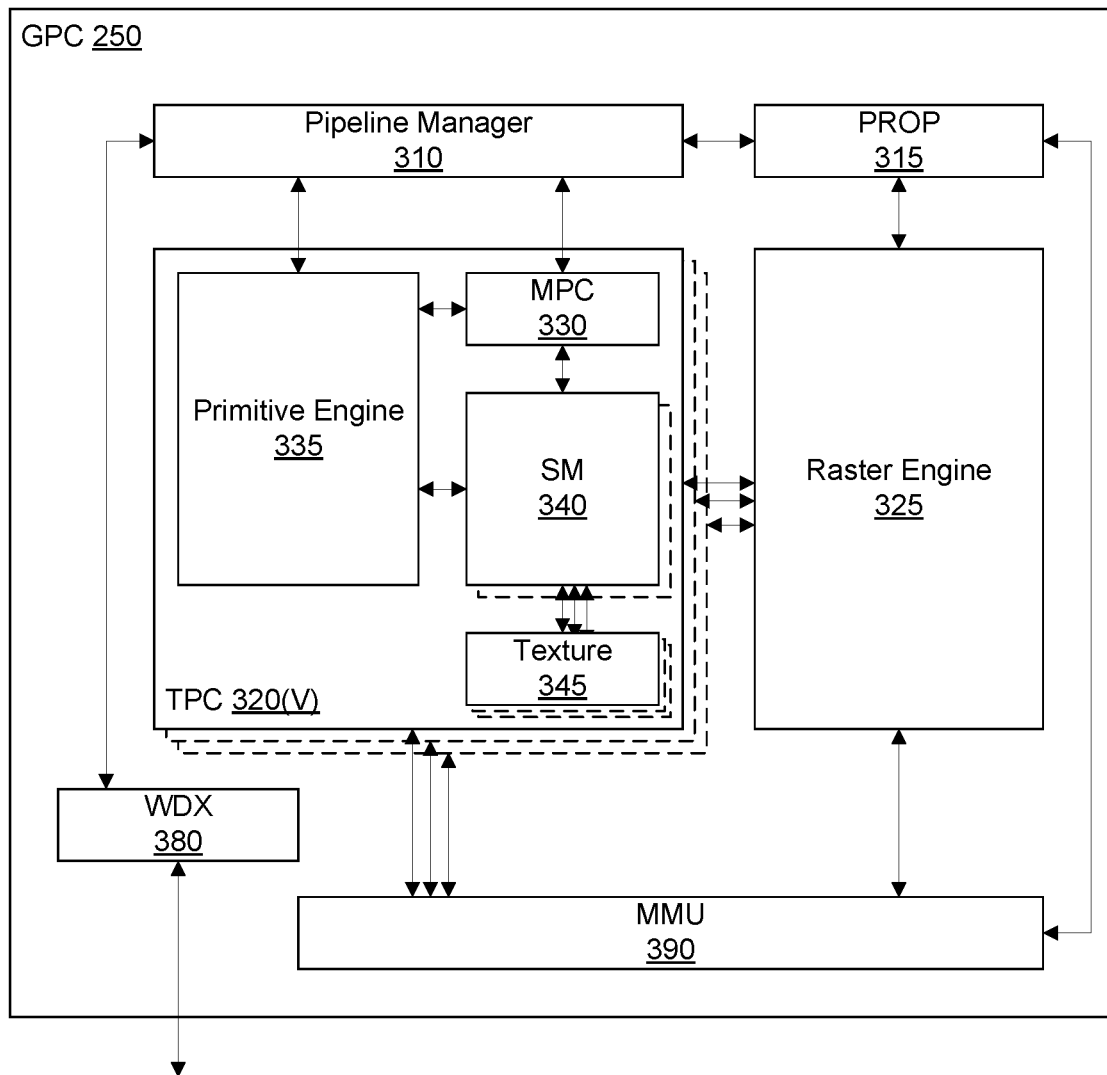
FIG. 3A illustrates a general processing cluster of the PPU of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 325 comprises fragments to be processed, for example, by a fragment shader implemented within a TPC 320.

Each TPC 320 included in the GPC 250 includes an M-Pipe Controller (MPC) 330, a primitive engine 335, one or more SMs 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). The texture unit 345 is also used as the Load/Store path for SM 340 to MMU 390. In one embodiment, each TPC 320 includes two (2) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
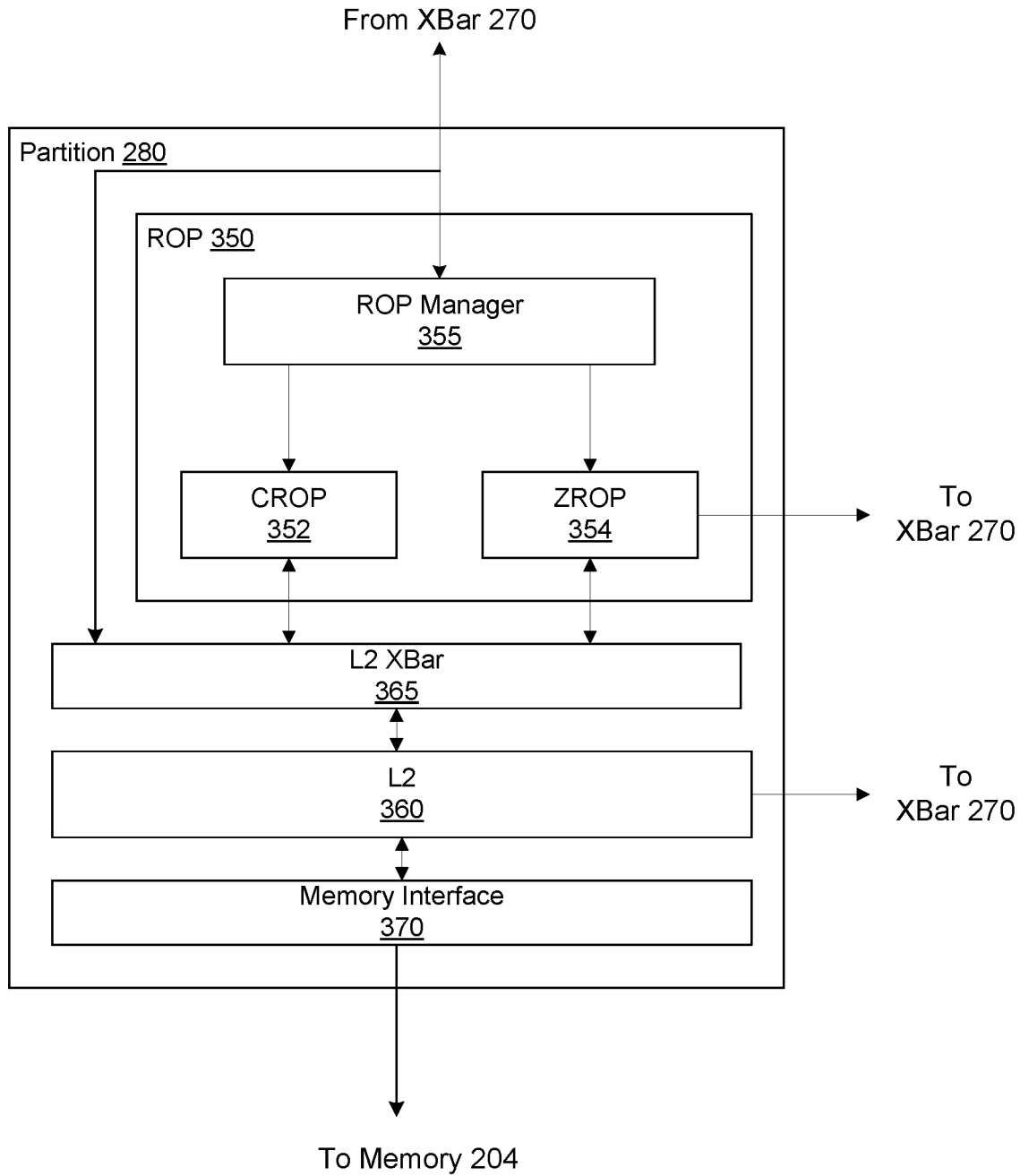
FIG. 3B illustrates a partition unit of the PPU of FIG. 2, in accordance with one embodiment.

FIG. 3B illustrates a partition unit 280 of the PPU 200 of FIG. 2, in accordance with one embodiment. As shown in FIG. 3B, the partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per partition unit 280, where each partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 8.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
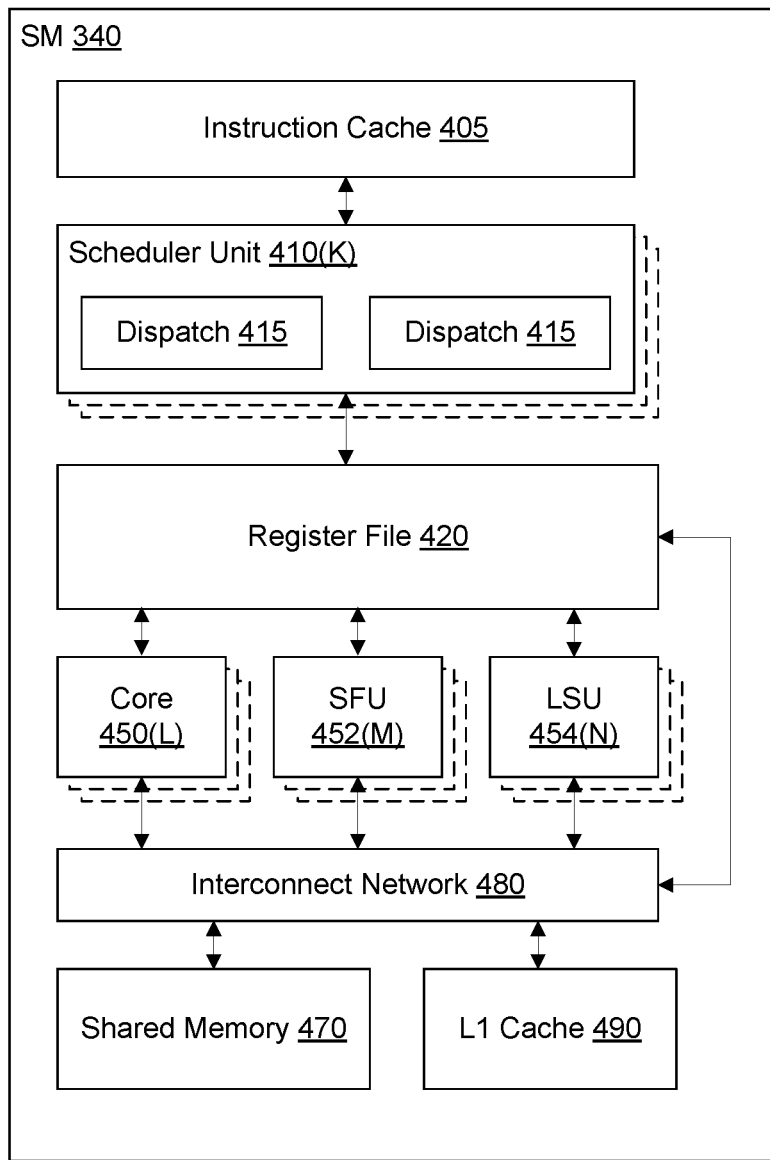
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, a shared memory 470 and an L1 cache 490.

As described above, the work distribution unit 225 dispatches tasks for execution on the GPCs 250 of the PPU 200. The tasks are allocated to a particular TPC 320 within a GPC 250 and, if the task is associated with a shader program, the task may be allocated to an SM 340. The scheduler unit 410 receives the tasks from the work distribution unit 225 and manages instruction scheduling for one or more groups of threads (i.e., warps) assigned to the SM 340. The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In one embodiment, the SM 340 includes a large number (e.g., 128, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 that perform special functions (e.g., attribute evaluation, reciprocal square root, and the like), and N LSUs 454 that implement load and store operations between the shared memory 470 or L1 cache 490 and the register file 420. In one embodiment, the SM 340 includes 128 cores 450, 32 SFUs 452, and 32 LSUs 454.

Each SM 340 includes an interconnect network 480 that connects each of the functional units to the register file 420 and the LSU 454 to the register file 420, shared memory 470 and L1 cache 490. In one embodiment, the interconnect network 480 is a crossbar that can be configured to connect any of the functional units to any of the registers in the register file 420 and connect the LSUs 454 to the register file and memory locations in shared memory 470 and L1 cache 490.

The shared memory 470 is an array of on-chip memory that allows for data storage and communication between the SM 340 and the primitive engine 335 and between threads in the SM 340. In one embodiment, the shared memory 470 comprises 64 KB of storage capacity. An L1 cache 490 is in the path from the SM 340 to the partition unit 280. The L1 cache 490 can be used to cache reads and writes. In one embodiment, the L1 cache 490 comprises 24 KB of storage capacity.

The PPU 200 described above may be configured to perform highly parallel computations much faster than conventional CPUs. Parallel computing has advantages in graphics processing, data compression, biometrics, stream processing algorithms, and the like.

When configured for general purpose parallel computation, a simpler configuration can be used. In this model, as shown in FIG. 2, fixed function graphics processing units are bypassed, creating a much simpler programming model. In this configuration, the Work Distribution Unit 225 assigns and distributes blocks of threads directly to the TPCs 320. The threads in a block execute the same program, using a unique thread ID in the calculation to ensure each thread generates unique results, using the SM 340 to execute the program and perform calculations, shared memory 470 communicate between threads, and the LSU 454 to read and write Global memory through partition L1 cache 490 and partition unit 280.

When configured for general purpose parallel computation, the SM 340 can also write commands that scheduler unit 220 can use to launch new work on the TPCs 320.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Temporal Ensembling for Semi-Supervised Learning

Figure 5:
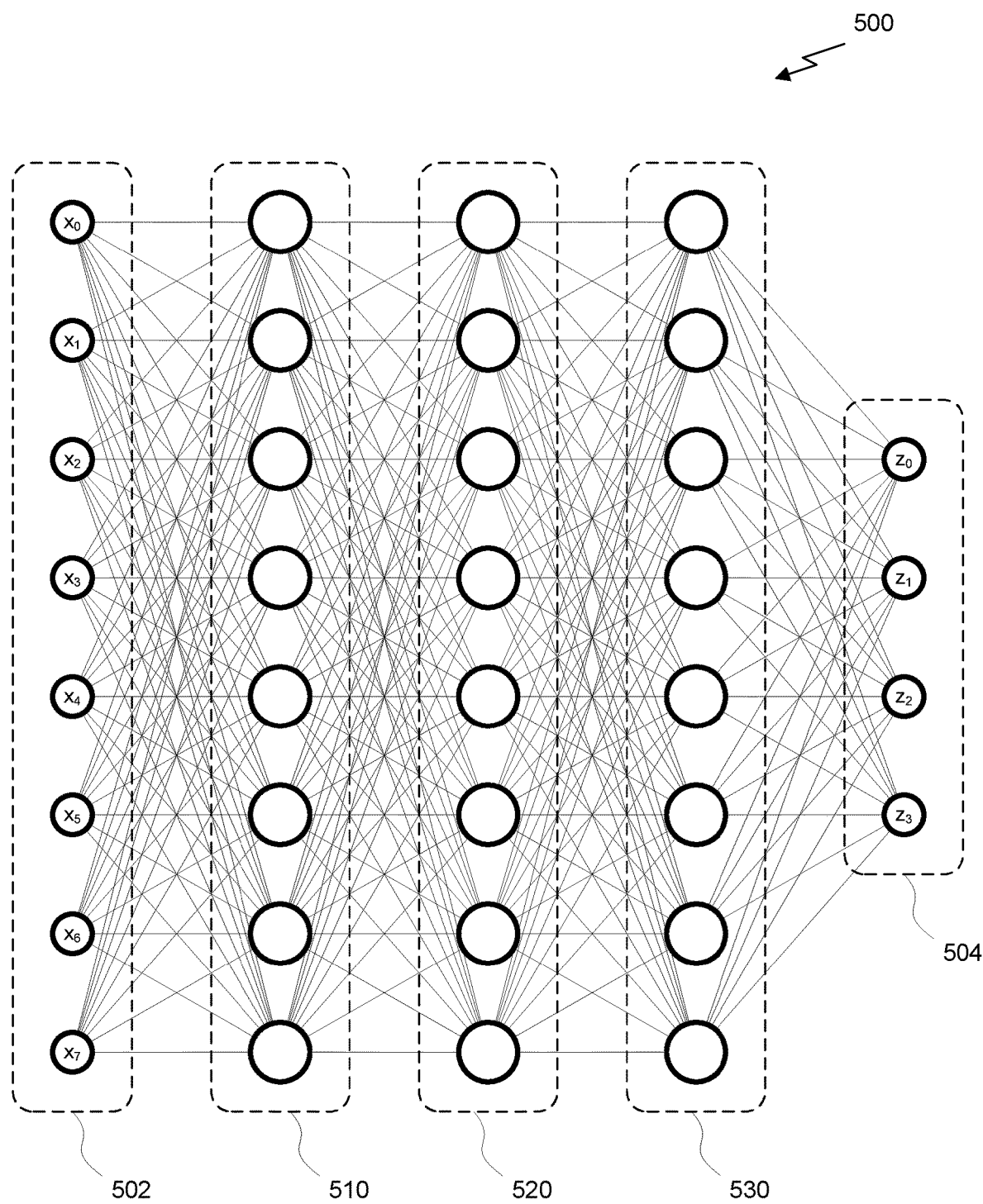
FIG. 5 illustrates a deep neural network, in accordance with the prior art.

FIG. 5 illustrates a deep neural network 500, in accordance with the prior art. The deep neural network 500 comprises a number of interconnected layers. An input layer 502 is connected to a first hidden layer 510; the first hidden layer 510 is connected to a second hidden layer 520; the second hidden layer 520 is connected to a third hidden layer 530; and the third hidden layer 530 is connected to an output layer 504. As shown, the deep neural network 500 includes three fully connected hidden layers. As used herein, a fully connected layer refers to a layer of the neural network where each neuron in the fully connected layer receives the output of every neuron in a previous layer as inputs.

A neuron of the deep neural network 500 applies an input filter to a number of inputs and processes the filtered input by an activation function to generate an output. The input filter may be, e.g., a weighted sum of a plurality of input values. The activation function may be, e.g., a step function based on a threshold value, a sign function that indicates whether the input is positive or negative, or any other type of activation function that converts the filtered input value to an output value. Each neuron has the same basic structure. However, each neuron may be calibrated to use different parameters (i.e., input filter weights) and/or different activation functions.

In some embodiments, the deep neural network 500 may include layers that are not fully-connected (i.e., neurons may only receive a subset of the outputs of the neurons in a previous layer as inputs). Furthermore, in some embodiments, the hidden layers of the deep neural network 500 may include different numbers of neurons (i.e., the number of outputs in one layer does not equal the number of outputs in a previous layer). For example, if the deep neural network 500 is implemented as a convolution neural network, then some hidden layers may implement convolution functions, other hidden layers may implement pooling functions, and yet other hidden layers may implement fully connected layers, each layer having various numbers of neurons that implement various sized convolution filters, sub-sample the output of a particular layer to a different degree, and so forth. It should be noted that the deep neural network 500 shown above is merely one example of the structure of a deep learning network. The temporal ensembling for semi-supervised learning technique discussed in more detail below is not limited to applications involving only the deep neural network 500 and other types and architectures of deep learning networks, such as convolution neural networks (CNNs), recursive neural networks (RNNs), and the like are contemplated as being within the scope of the present disclosure.

In one embodiment, the deep neural network 500 may be implemented on a parallel processing unit, such as PPU 200. Each neuron in a layer of the deep neural network 500 may be implemented as a thread in a thread block, with multiple threads implementing multiple neurons being executed by the PPU 200 in parallel. Each thread may access the inputs of the neuron in registers or shared memory accessible by the thread. The thread may store the output of the neuron back to a register or shared memory such that the outputs may be accessed by subsequent layers of the deep neural network 500.

Figure 6:
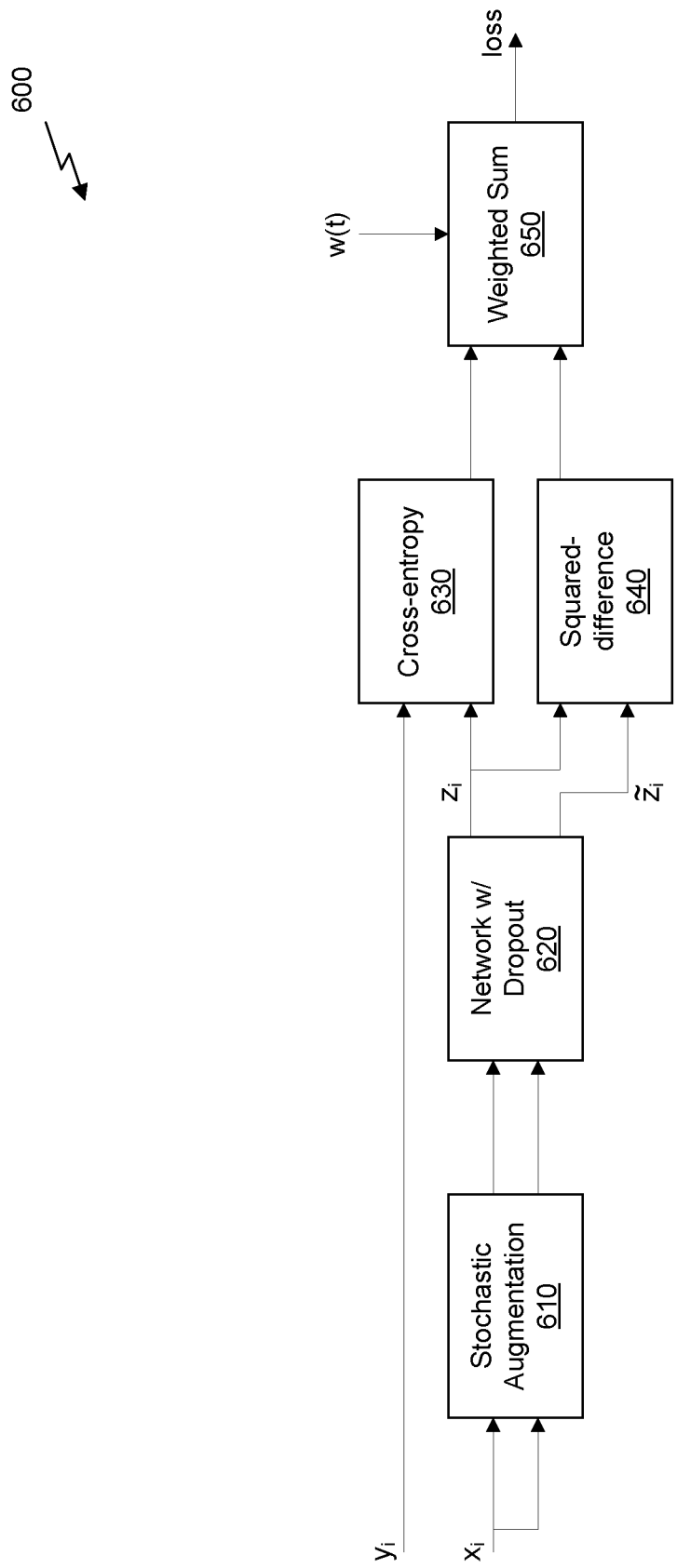
FIG. 6 illustrates the structure of a Π-model utilized to train a network, in accordance with the prior art.

FIG. 6 illustrates the structure 600 of a Π-model utilized to train a network, in accordance with the prior art. It is well known that an ensemble of multiple neural networks generally yields better predictions than a single network in the ensemble. This effect has been indirectly exploited when training a single network using dropout, dropconnect, and/or stochastic depth regularization techniques. In addition, ensembling has been utilized in swapout networks, where training always focuses on a particular subset of the network and, therefore, the complete network can be seen as an implicit ensemble of such trained sub-networks.

The Π-model implements self-ensembling during training by encouraging consistent network output between two realizations of the same input stimulus, under two different dropout conditions. The Π-model is a special case of the transformation/stability loss model described by Sajjadi, where the number of n evaluations performed is limited to n=2. The training data includes N inputs, out of which M are labeled (M≤N). The input stimuli, available for all training data, are denoted $x_i$, where i∈{1 . . . N}. The set L contains the indices of the labeled inputs, |L|=M. For every i∈L, we have a known correct label $y_i$∈{1 . . . C}, where C is the number of different classes.

During training, the Π-model evaluates the network for each training input $x_i$ twice, resulting in prediction vectors $z_i$ and $\tilde{z}_i$. During the two training evaluations, stochastic augmentation is applied to the same input $x_i$ to generate two different modified input vectors to be evaluated by the network, and the differences between the two prediction vectors are used to calculate an unsupervised component of a loss function. The loss function includes two components: a supervised component and an unsupervised component. The supervised component is the standard cross-entropy loss, evaluated for labeled inputs only. The unsupervised component, evaluated for all inputs, penalizes different predictions for the same training input $x_i$ by taking the mean square difference between prediction vectors $z_i$ and $\tilde{z}_i$. To combine the supervised (cross-entropy loss) and unsupervised (squared-difference loss) loss terms, the unsupervised loss term is scaled by a time-dependent weighting function $w(t)$. By comparing the prediction vectors $z_i$ and $\tilde{z}_i$, the Π-model requires the two evaluations based on the same training input $x_i$ to be close, which is a stronger requirement compared to asking that only the final classification remains the same. It will be appreciated that the choice of using cross-entropy to compute the supervised loss component and mean-squared difference to compute the unsupervised loss component is merely a design choice and that other comparison functions could be used in lieu of the cross-entropy or mean-squared difference functions. In addition, both the supervised loss component and the unsupervised loss component could be based on the same function, but comparing different inputs.

As shown in FIG. 6, the Π-model structure processes the training input $x_i$ by a stochastic augmentation block 610 that introduces noise into the input vector for each of the two evaluations. For example, the stochastic augmentation layer 610 may adjust the values within the input vector according to some noise function where the magnitude of the noise is restricted within some bounds. In the case of an image, for example, the stochastic augmentation layer 610 may change the color of a percentage of pixels in the image, may add random noise by adjusting color values up or down for each pixel within some limits, may perform affine transformations of the image (i.e., translations, rotations, etc.), or may warp the image, etc. The noisy inputs are then evaluated by the network 620.

The first network evaluation generates the first prediction vector $z_i$ using the first noisy input, and the second network evaluation generates the second prediction vector $\tilde{z}_i$ using the second noisy input. It is important to note that the network 620 may be implemented with dropout regularization in order to make the training of the network more robust. Dropout regularization refers generally to forcing the output of specific neurons within the network to have a particular value (typically forcing the output to zero), regardless of the input values for the neurons. Each network evaluation may utilize different dropout of random neurons within the network. The stochastic noise in the input vectors $x_i$ and dropout regularization that changes between evaluations explains the expected differences between prediction vectors $z_i$ and $\tilde{z}_i$. The prediction vectors $z_i$ and $\tilde{z}_i$ generated by the network 620, along with the corresponding labels $y_i$ included in the training data, are passed to the cross-entropy block 630 and the square-difference block 640 to compute the two components (supervised and unsupervised) of the loss function, which are combined by the weighted sum block 650.

The weighted sum block 650 may implement an unsupervised loss weighting function that ramps up, starting from zero, along a Gaussian curve during the first P training epochs (e.g., 80 training epochs). As used herein, a training epoch refers to a network evaluation of a set of training vectors through the Π-model. Consequently, in the beginning of the training process, the total loss and learning gradients (i.e., the aggregate loss value) are dominated by the supervised loss component evaluated during the first evaluation and compared against the corresponding labels $y_i$ included in the training data. After the network parameters have been adjusted at the start of the training process, the unsupervised loss component gradually ramps up and results in a more robust network.

The following table contains pseudocode related to the Π-model:

TABLE 1

Require: $x_i$ = training stimuli
Require: L = set of training input indices with known labels
Require: $y_i$ = labels for labeled inputs i ∈ L
Require: w(t) = unsupervised weight ramp-up function
Require: $f_θ(x)$ = stochastic neural network with trainable parameters θ

TABLE 1-continued

Require: g(x) = stochastic input augmentation function
    for t in [1, num_epochs] do
        for each minibatch B do $z_{i \in B} \leftarrow f_\theta(g(x_{i \in B}))$     evaluate network outputs for augmented inputs
        $\tilde{z}_{i \in B} \leftarrow f_\theta(g(x_{i \in B}))$     again, with different dropout and augmentation $\text{loss} \leftarrow -\frac{1}{|B|} \sum_{i \in (B \cap L)} \log z_i[y_i] +$     supervised loss component
        unsupervised loss component $w(t) \frac{1}{C|B|} \sum_{i \in B} \|z_i - \tilde{z}_i\|^2$ update θ using, e.g., ADAM     update network parameters
        end for
    end for
    return θ

The main problem with the Π-model is that it requires multiple evaluations of the network, once to generate a first prediction vector $z_i$ and a second time to generate a second prediction vector $\tilde{z}_i$. This essentially doubles the time required to train the network. However, by analyzing the structure of the Π-model, it becomes apparent that the evaluation of the two branches can be split into two separate phases: (1) classifying the training set once without updating the network parameters θ; and (2) training the network on the same inputs under different stochastic augmentations and dropout, using the just obtained predictions as targets for the unsupervised loss component. The training targets obtained in this fashion are expected to be noisy, because they are based on a single evaluation of the network. However, temporal ensembling can alleviate this by aggregating predictions of multiple previous network evaluations into an ensemble prediction. This enables the network to be evaluated only once during training, gaining an approximate 2× speedup over the Π-model.

Figure 7:
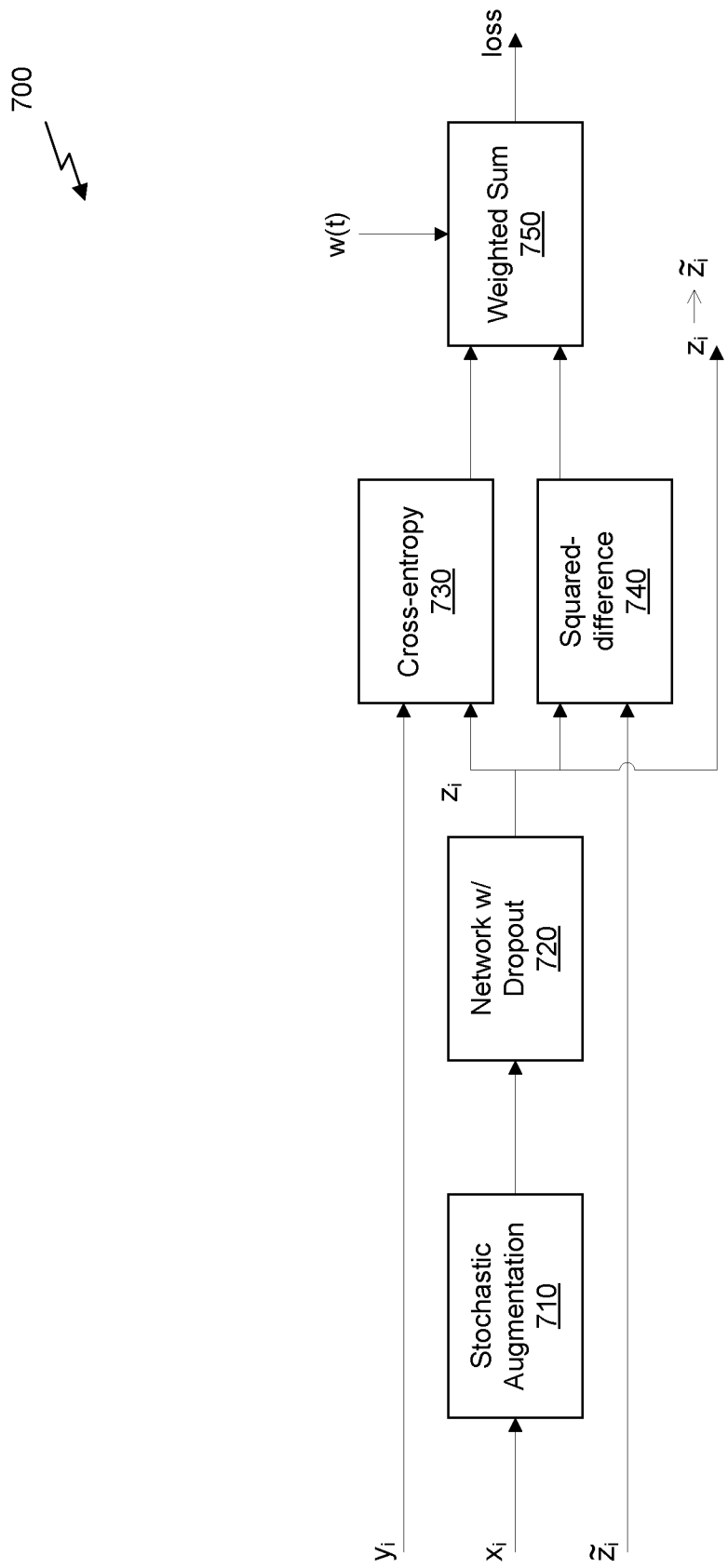
FIG. 7 illustrates the structure of a temporal ensembling model utilized to train a network, in accordance with one embodiment.

FIG. 7 illustrates the structure 700 of a temporal ensembling model utilized to train a network, in accordance with one embodiment. The main difference between temporal ensembling and the Π-model is that the network and stochastic augmentation are evaluated only once per input per training epoch, and the target prediction vector $\tilde{z}_i$ for the unsupervised loss component is based on prior network evaluations instead of a second evaluation of the network. After each training epoch, the prediction vector $z_i$ is accumulated into ensemble outputs $Z_i$ by updating $\tilde{z}_i \leftarrow \alpha \tilde{z}_i + (1-\alpha)z_i$, where $\alpha \in [0,1]$ is a momentum term that controls how far the ensemble reaches into the training history. $Z_i$ contains a weighted average of the outputs of an ensemble of networks from previous training epochs due to dropout regularization and stochastic augmentation. In one embodiment, when generating the target prediction vector $\tilde{z}_i$, startup bias in $\tilde{z}_i$ is corrected by dividing by a factor $(1-\alpha^t)$.

As shown in FIG. 7, the temporal ensembling structure processes the training input $x_i$ by a stochastic augmentation block 710 that introduces noise into the input vector for a single evaluation by the network 720. In one embodiment, the stochastic augmentation layer 710 may adjust the values within the input vector according to some noise function where the magnitude of the noise is restricted within some bounds. The noisy input vectors are then evaluated by the network 720 in a single evaluation during a training epoch.

The network 720 generates prediction vectors $z_i$ by evaluating the noisy input vectors applied during the training epoch. Again, the network 720 may be implemented with dropout regularization in order to make the training of the network more robust. The prediction vectors $z_i$ are passed to the cross-entropy block 730 along with the corresponding labels $y_i$ included in the training data. Again, the cross-entropy block 730 is only utilized to generate a supervised loss term for those input vectors in the training set that are associated with a corresponding label vector; otherwise, the supervised loss component is forced to zero for the input vector. The cross-entropy block 730 computes a first component (supervised) of the loss function. The prediction vectors $z_i$ and target prediction vectors $\tilde{z}_i$ are also passed to the square-difference block 740 to compute the second component (unsupervised) of the loss function. Importantly, the square-difference block 740 receives the target prediction vectors $\tilde{z}_i$ computed during a previous training epoch and not directly from the network 720 performing an additional evaluation of augmented input data like in the Π-model. As shown, the prediction vectors $z_i$ computed during this training epoch are utilized to update the target prediction vectors $\tilde{z}_i$ utilized during the next training epoch. The weighted sum block 750 combines the first and second components of the loss function based on a weighting function w(t). Of course, the choice of using a cross-entropy to compute the supervised loss component in the cross-entropy block 730 and mean-squared difference to compute the unsupervised loss component in the square-difference block 740 is merely a design choice and other comparison functions could be used in lieu of the cross-entropy or mean-squared difference functions in these blocks.

The benefits of the temporal ensembling model when compared to the Π-model are twofold. First, the training is performed faster because the network is only evaluated once per input during each training epoch. Second, the target prediction vectors $\tilde{z}_i$ generated by the network 720 can be expected to be less noisy than with the Π-model structure 600. Better results have been obtained with temporal ensembling than with the Π-model using the same number of training epochs. Nevertheless, the downside to temporal ensembling is that there is a need to store auxiliary data across training epochs along with creating a new hyperparameter: α. In one embodiment, a matrix Z, storing the target prediction vectors $\tilde{z}_i$ for all input vectors $x_i$, can be stored in a memory mapped file because even though the size of Z may be quite large, the elements of Z are accessed relatively infrequently.

The following table contains pseudocode related to the temporal ensemble model:

TABLE 2

Require: $x_i$ = training stimuli
Require: L = set of training input indices with known labels
Require: $y_i$ = labels for labeled i ∈ L
Require: α = ensembling momentum, 0 ≤ α < 1
Require: w(t) = unsupervised weight ramp-up function
Require: $f_\theta(x)$ = stochastic neural network with trainable parameters θ
Require: g(x) = stochastic input augmentation function
    $Z \leftarrow 0_{(N \times C)}$     initialize ensemble predictions
    $\tilde{z} \leftarrow 0_{(N \times C)}$     initialize target vectors
    for t in [1, num_epochs] do
        for each minibatch B do $z_{i \in B} \leftarrow f_\theta(g(x_{i \in B}, t))$     evaluate network outputs for augmented inputs $\text{loss} \leftarrow -\frac{1}{|B|} \sum_{i \in (B \cap L)} \log z_i[y_i] +$     supervised loss component
        unsupervised loss component $w(t) \frac{1}{C|B|} \sum_{i \in B} \|z_i - \tilde{z}_i\|^2$ TABLE 2-continued

| | |
|---|---|
| update θ using, e.g., ADAM | update network parameters |
| end for | |
| $Z \leftarrow \alpha Z + (1-\alpha)z$ | accumulate ensemble predictions |
| $\tilde{z} \leftarrow Z/(1-\alpha^t)$ | construct target vectors by bias correction |
| end for | |
| return θ | |

Figure 8:
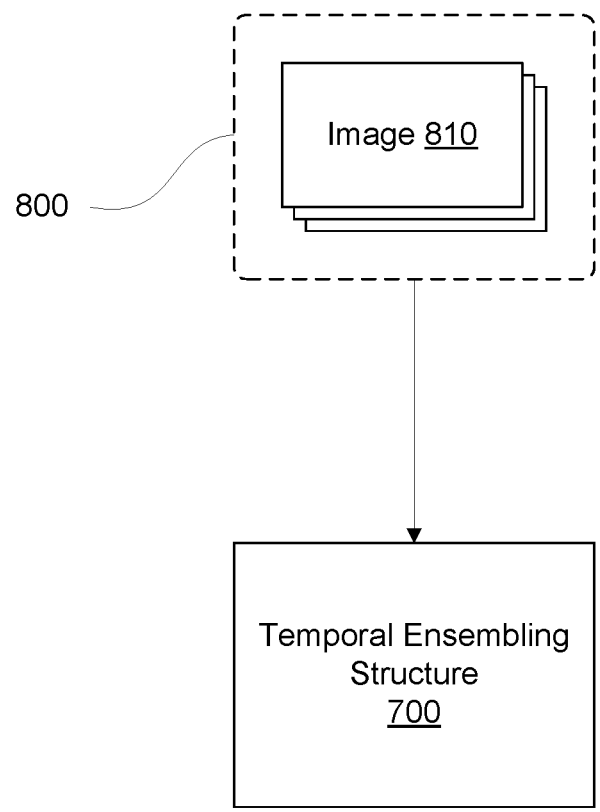
FIG. 8 illustrates a technique for training a network according to the temporal ensembling model, in accordance with one embodiment.

FIG. 8 illustrates a technique for training a network 720 according to the temporal ensembling model, in accordance with one embodiment. As shown in FIG. 8, a set of training data 800 is provided to train the network 720 to perform a task. In one embodiment, the network 720 comprises a convolution neural network (CNN) configured to perform an image classification task. In such an embodiment, the set of training data 800 may include thousands or millions of images 810 classified according to a plurality of labels.

In one embodiment, merely by way of example, the set of training data 800 may be a set of thousands of small format images (e.g., 32 pixel by 32 pixel RGB images) separated into a plurality of classes. Examples of such datasets are a CIFAR-10 dataset, which consists of ~50,000 color images sorted into 10 classes (i.e., airplane, automobile, bird, cat, deer, dog, frog, horse, ship, and truck), and a SVHN (Street View House Number) dataset, which consists of ~75,000 color images sorted into ten classes (i.e., numbers 0-9). Each of these datasets may be utilized as the set of training data 800 to train the network 720.

The stochastic augmentation block 710 may receive each image 810 from the set of training data 800 and add stochastic noise to the image 810. Examples of stochastic noise are changing a percentage of pixels in the image, performing affine transformations of the image (i.e., translations, rotations, etc.), warping the image, etc. The modified images are then processed by the network 720 to generate a prediction vector $z_i$ corresponding to the image. In one embodiment, the prediction vector is a vector of values corresponding to each of the ten classes. In one embodiment, each value in the prediction vector represents a probability that the image 810 belongs to a particular class in the plurality of classes associated with the dataset. In another embodiment, the prediction vector consists of a plurality of elements corresponding to the plurality of classes, and one element of the prediction vector is set to 1 while all other elements of the prediction vector are set to 0. The element of the prediction vector set to 1 identifies the predicted class of the image 810.

The cross-entropy block 730 computes a supervised component of the loss function by comparing the prediction vector $z_i$ with the label $y_i$ corresponding to the image 810 from the training set. The label $y_i$ may consist of a vector that identifies the classification of the image 810. The squared difference block 740 computes an unsupervised component of the loss function by comparing the prediction vector $z_i$ with the target prediction vector $\tilde{z}_i$ calculated based on the prediction vector $z_i$ over one or more previous training epochs. During the first training epoch, the target prediction vector $\tilde{z}_i$ is initialized (e.g., set to a zero vector). The target prediction vector $\tilde{z}_i$ may then be updated for additional training epochs using the prediction vector $z_i$, and the loss term may be calculated according to the loss function by the weighted sum block 750 based on the weighting function w(t).

A training epoch consists of evaluating each image 810 in the set of training data 800 once to compute a loss term corresponding to each image 810. For example, in a dataset with 50,000 images, 50,000 loss terms may be calculated. The generated loss terms may then be used to adjust the network parameters θ of the network 720. For example, gradients of the network parameters with respect to the loss term may be utilized to adjust the network parameters (i.e., the loss term may be used indirectly, such as by trying to minimize the loss term, when adjusting network parameters). Once the network parameters θ have been adjusted, another training epoch may be executed using the same set of training data 800. It will be appreciated that the stochastic augmentation block 710 may add different noise to the same underlying image 810 during each training epoch, such that the set of images analyzed by the network 720 is not the same during each training epoch. Again, the network 720 may also implement dropout to add robustness to the training. Further, in some embodiments, each training epoch may sample the set of training data 800 to select a random subset of images from the overall set of training data 800 to use during a particular training epoch. Thus, each training epoch may not be based on the same identical inputs.

It will be appreciated that the target prediction vectors $\tilde{z}_i$ need to be stored across multiple training epochs. For example, a target prediction vector $\tilde{z}_i \leftarrow \alpha \tilde{z}_i + (1-\alpha)z_i$ corresponding to each image 810 is updated each time the image 810 is analyzed by the network 720. The target prediction vector $\tilde{z}_i$ is stored for reuse in subsequent training epochs. In one embodiment, the target prediction vector $\tilde{z}_i$ is corrected for bias by dividing each value in the target prediction vector by a correction factor such as $(1-\alpha^t)$. In addition to storing label vectors $y_i$, as included in the set of training data 800, an additional target prediction vector $\tilde{z}_i$ is stored for each image 810 and updated during training. A number of training epochs are performed (e.g., 100) using the set of training data 800 to adjust the network parameters θ, and then new images may be classified according to the network 720.

It has been shown through experimentation that the temporal ensembling model technique detailed above increases accuracy of the network 720 while providing an approximately 2× speedup over the Π-model technique utilized in the prior art.

Figure 9:
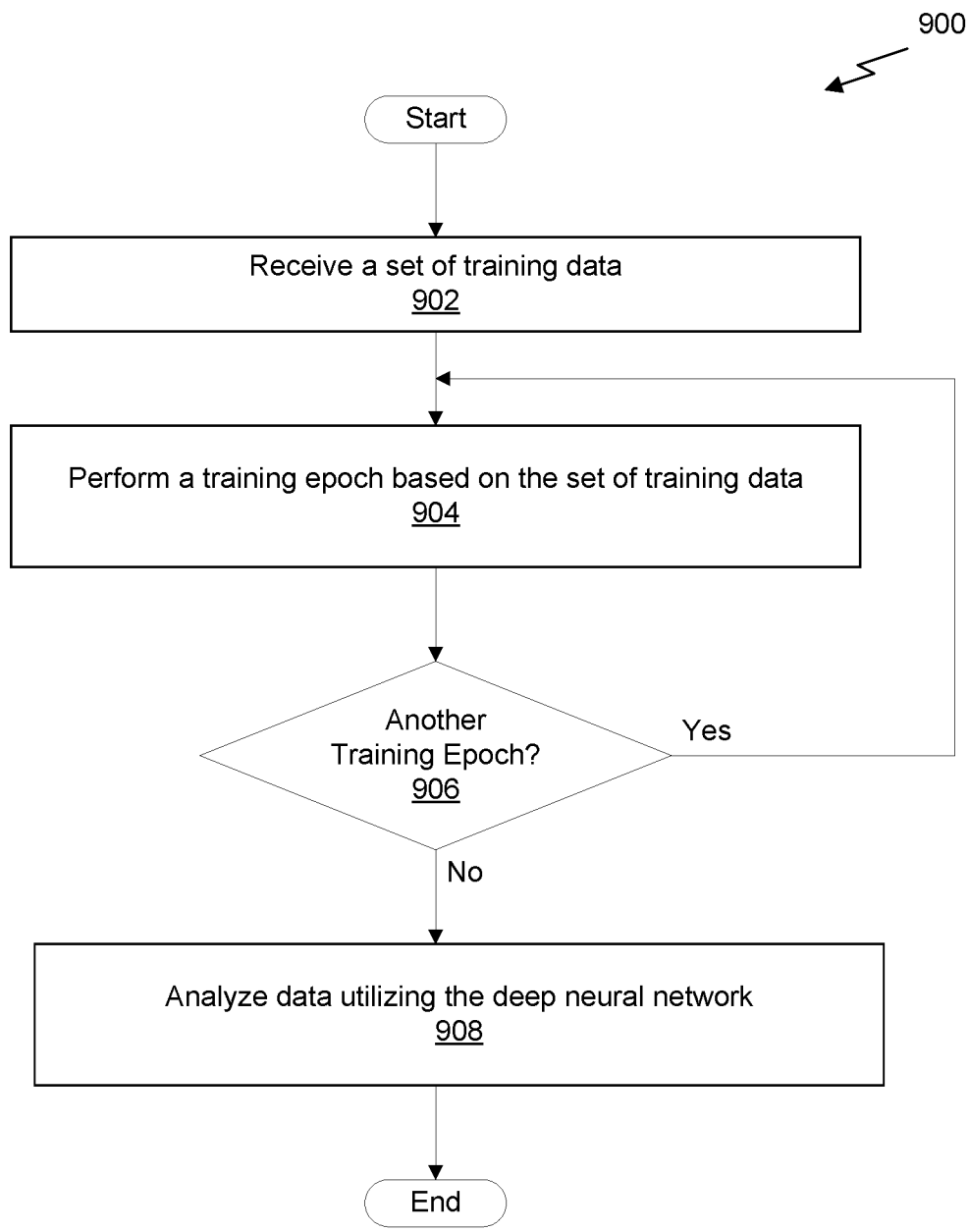
FIG. 9 illustrates a flowchart of a method for training a deep neural network utilizing a temporal ensembling model, in accordance with one embodiment.

FIG. 9 illustrates a flowchart of a method 900 for training a deep neural network utilizing a temporal ensembling model, in accordance with one embodiment. It will be appreciated that the method 900 is described within the scope of software executed by a processor; however, in some embodiments, the method 900 may be implemented in hardware or some combination of hardware and software. In one embodiment, the method 900 is performed by the PPU 200. The method 900 begins at step 902, where a set of training data 800 is received. In one embodiment, the set of training data 800 is stored in a database accessible over a network.

At step 904, a training epoch is performed utilizing the training data set 800. In one embodiment, the training data set 800 is separated into a plurality of batches, each batch containing a subset of the input vectors $x_i$ in the training data set 800. For each batch in the plurality of batches, each input vector $x_i$ in the batch is adjusted by a stochastic augmentation block 710 to add noise to the input vector. The modified input vector is then analyzed by the network 720 to generate a prediction vector $z_i$ corresponding to the input vector $x_i$. The prediction vector $z_i$ is compared against a label vector $y_i$ to calculate a first component of a loss function by the cross-entropy block 730, and the prediction vector $z_i$ is compared against a target prediction vector $\tilde{z}_i$ to calculate a second component of the loss function by the squared difference block 740. The weighted sum block 750 combines the first component and the second component according to a weighting function w(t) to generate a loss term corresponding to the input vector $x_i$. The target prediction vector $\tilde{z}_i$ is updated for the input vector and stored in a memory. Network parameters θ are adjusted at the end of each batch in the plurality of batches.

At step 906, one or more additional training epochs are performed utilizing the set of training data 800 and the stored target prediction vectors $\tilde{z}_i$. In one embodiment, each additional training epoch reuses the target prediction vectors $\tilde{z}_i$ calculated during the last training epoch.

At step 908, new data is analyzed by the deep neural network. For example, new images may be analyzed by the network 720 to generate a prediction vector to classify the image.

Figure 10:
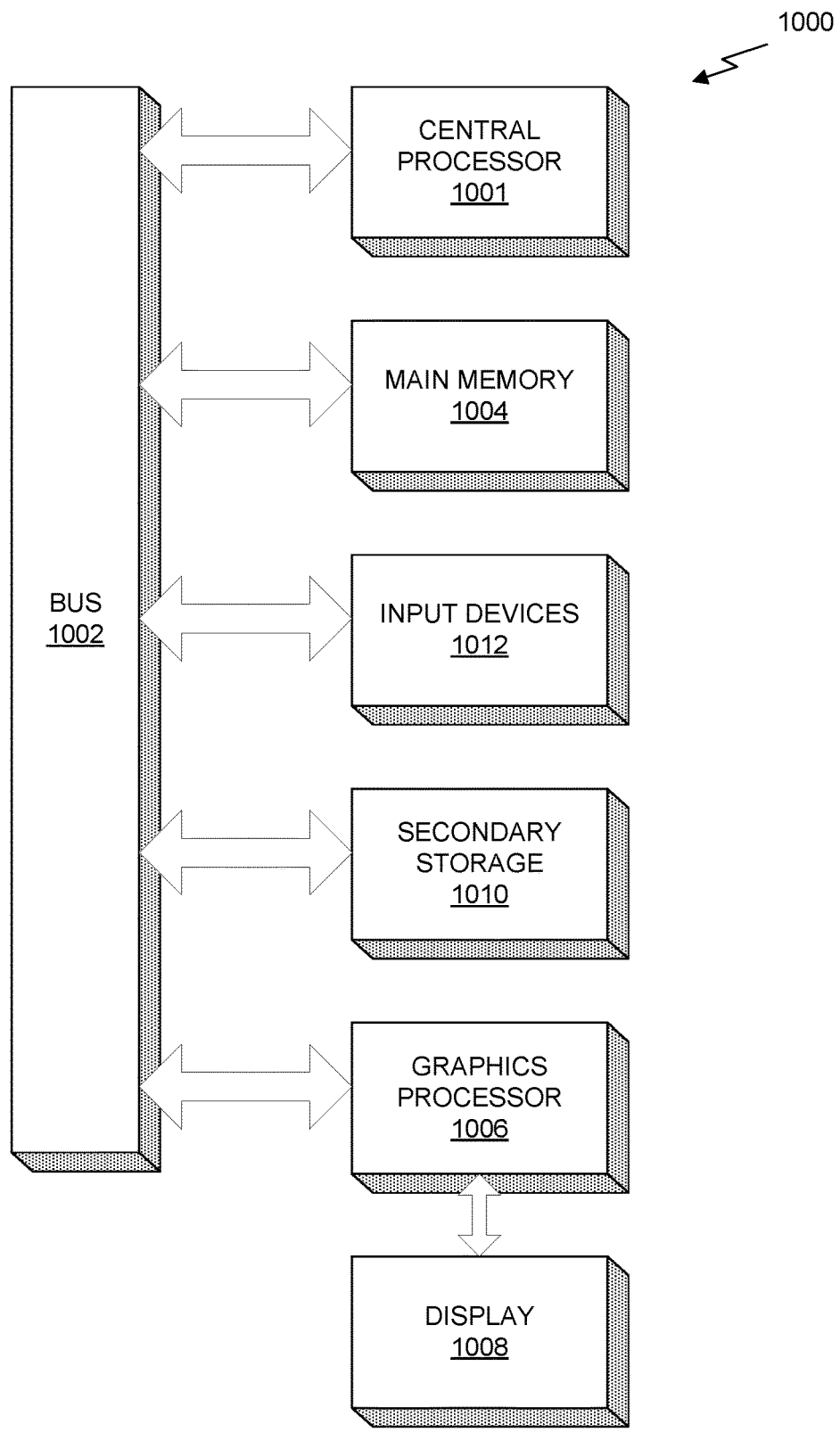
FIG. 10 illustrates an exemplary system in which the various architecture and/or functionality of the various previous embodiments may be implemented.

FIG. 10 illustrates an exemplary system 1000 in which the various architecture and/or functionality of the various previous embodiments may be implemented. As shown, a system 1000 is provided including at least one central processor 1001 that is connected to a communication bus 1002. The communication bus 1002 may be implemented using any suitable protocol, such as PCI (Peripheral Component Interconnect), PCI-Express, AGP (Accelerated Graphics Port), HyperTransport, or any other bus or point-to-point communication protocol(s). The system 1000 also includes a main memory 1004. Control logic (software) and data are stored in the main memory 1004 which may take the form of random access memory (RAM).

The system 1000 also includes input devices 1012, a graphics processor 1006, and a display 1008, i.e. a conventional CRT (cathode ray tube), LCD (liquid crystal display), LED (light emitting diode), plasma display or the like. User input may be received from the input devices 1012, e.g., keyboard, mouse, touchpad, microphone, and the like. In one embodiment, the graphics processor 1006 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1000 may also include a secondary storage 1010. The secondary storage 1110 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1004 and/or the secondary storage 1010. Such computer programs, when executed, enable the system 1000 to perform various functions. The memory 1004, the storage 1010, and/or any other storage are possible examples of computer-readable media.

In one embodiment, the architecture and/or functionality of the various previous figures may be implemented in the context of the central processor 1001, the graphics processor 1006, an integrated circuit (not shown) that is capable of at least a portion of the capabilities of both the central processor 1001 and the graphics processor 1006, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1000 may take the form of a desktop computer, laptop computer, server, workstation, game consoles, embedded system, and/or any other type of logic. Still yet, the system 1000 may take the form of various other devices including, but not limited to a personal digital assistant (PDA) device, a mobile phone device, a television, etc.

Further, while not shown, the system 1000 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving a set of training data for a deep neural network, wherein the set of training data includes a plurality of input vectors and a plurality of label vectors, each label vector in the plurality of label vectors corresponding to a particular input vector in the plurality of input vectors; and
training the deep neural network utilizing the set of training data by:
processing the plurality of input vectors by the deep neural network to generate a plurality of prediction vectors, each prediction vector in the plurality of prediction vectors corresponding to one of the input vectors in the plurality of input vectors, and
for each prediction vector in the plurality of prediction vectors corresponding to the particular input vector:
computing a loss term associated with the particular input vector by combining a supervised component and an unsupervised component according to a weighting function, wherein the unsupervised component is calculated by comparing the prediction vector with a target prediction vector associated with the particular input vector, and
after calculating the unsupervised component, updating the target prediction vector associated with the particular input vector by combining at least a portion of the prediction vector into the target prediction vector.

2. The method of claim 1, wherein the plurality of input vectors are processed by the deep neural network over a number of training epochs, and wherein the target prediction vector associated with the particular input vector and updated during a current training epoch is utilized during computation of the unsupervised component of the loss term for the particular input vector during a subsequent training epoch.

3. The method of claim 2, wherein the weighting function is a function of the number of training epochs that have been performed.

4. The method of claim 1, wherein training the deep neural network utilizing the set of training data further includes stochastic augmentation of the plurality of input vectors prior to processing by the deep neural network.

5. The method of claim 1, wherein the deep neural network is a convolution neural network, and wherein each input vector in the plurality of input vectors is an image comprising a two-dimensional array of pixel values.

6. The method of claim 1, wherein updating the target prediction vector associated with the particular input vector comprises normalizing the target prediction vector according to a correction factor.

7. The method of claim 1, wherein the target prediction vector associated with the particular input vector is initialized to a zero vector prior to a first training epoch.

8. The method of claim 1, wherein the deep neural network is implemented on a parallel processing unit.

9. The method of claim 8, wherein each neuron in the deep neural network is implemented as a thread executed by the parallel processing unit.

10. The method of claim 1, wherein the plurality of input vectors are processed by the deep neural network over a number of training epochs and each input vector in the plurality of input vectors is processed once for each training epoch to generate the plurality of prediction vectors.

11. The method of claim 10, wherein the target prediction vector is calculated without processing the input vectors a second time during each training epoch.

12. The method of claim 1, wherein updating the target prediction vector accumulates the at least a portion of the prediction vector with a portion of the target prediction vector.

13. The method of claim 12, wherein the at least a portion is controlled by a momentum term.

14. A system, comprising:
a memory storing a set of training data for a deep neural network, wherein the set of training data includes a plurality of input vectors and a plurality of label vectors, each label vector in the plurality of label vectors corresponding to a particular input vector in the plurality of input vectors; and
a processor configured to train the deep neural network utilizing the set of training data by:
processing the plurality of input vectors by the deep neural network to generate a plurality of prediction vectors, each prediction vector in the plurality of prediction vectors corresponding to one of the input vectors in the plurality of input vectors, and
for each prediction vector in the plurality of prediction vectors corresponding to the particular input vector:
computing a loss term associated with the particular input vector by combining a supervised component and an unsupervised component according to a weighting function, wherein the unsupervised component is calculated by comparing the prediction vector with a target prediction vector associated with the particular input vector, and
after calculating the unsupervised component, updating the target prediction vector associated with the particular input vector by combining at least a portion of the prediction vector into the target prediction vector.

15. The system of claim 14, wherein the plurality of input vectors are processed by the deep neural network over a number of training epochs, and wherein the target prediction vector associated with the particular input vector and updated during a current training epoch is utilized during computation of the unsupervised component of the loss term for the particular input vector during a subsequent training epoch.

16. The system of claim 14, wherein training the deep neural network utilizing the set of training data further includes stochastic augmentation of the plurality of input vectors prior to processing by the deep neural network.

17. The system of claim 14, wherein the deep neural network is a convolution neural network, and wherein each input vector in the plurality of input vectors is an image comprising a two-dimensional array of pixel values.

18. The system of claim 14, wherein the target prediction vector associated with the particular input vector is initialized to a zero vector prior to a first training epoch.

19. The system of claim 14, wherein the processor comprises a parallel processing unit, and wherein each neuron in the deep neural network is implemented as a thread executed by the parallel processing unit.

20. A non-transitory, computer-readable storage medium storing instructions that, when executed by a processor, cause the processor to perform steps comprising:
receiving a set of training data for a deep neural network, wherein the set of training data includes a plurality of input vectors and a plurality of label vectors, each label vector in the plurality of label vectors corresponding to a particular input vector in the plurality of input vectors; and
training the deep neural network utilizing the set of training data by:
processing the plurality of input vectors by the deep neural network to generate a plurality of prediction vectors, each prediction vector in the plurality of prediction vectors corresponding to one of the input vectors in the plurality of input vectors, and
for each prediction vector in the plurality of prediction vectors corresponding to the particular input vector:
computing a loss term associated with the particular input vector by combining a supervised component and an unsupervised component according to a weighting function, wherein the unsupervised component is calculated by comparing the prediction vector with a target prediction vector associated with the particular input vector, and
after calculating the unsupervised component, updating the target prediction vector associated with the particular input vector by combining at least a portion of the prediction vector into the target prediction vector.

* * * * *